Nov. 19, 1940.  S. O. WHITE  2,221,895
BLOCKER SYNCHRONIZER
Filed May 31, 1938

Inventor:
Samuel O. White
By Edward P. Gritzbaugh
Atty.

Patented Nov. 19, 1940

2,221,895

UNITED STATES PATENT OFFICE 2,221,895

BLOCKER SYNCHRONIZER

Samuel O. White, Muncie, Ind., assignor to Borg-Warner Corporation, Chicago, Ill., a corporation of Illinois Application May 31, 1938, Serial No. 210,827

19 Claims. (Cl. 192—53)

This invention relates to synchronizing change speed gear transmissions of the type employed, for example, in motor vehicles wherein there is provided means for effecting synchronization of a pair or pairs of torque-transmitting members preparatory to connecting said members in positive drive engagement with each other.

The invention is particularly directed to synchronizing transmissions of the type wherein the synchronizing means comprises friction clutch elements drivingly associated with the respective torque-transmitting members and adapted to be moved into engagement with each other in the initial stage of the shifting movement, and wherein there is incorporated so-called "blocker" mechanism for preventing the positive drive engagement of the members prior to the time that synchronization is effected.

An object of the invention is to provide a transmission synchronizer of this type, having a minimum number of parts, and which is extremely inexpensive and simple to manufacture.

Another object is to provide such a transmission synchronizer which requires a minimum of manual effort to effect blocking of the movable positive drive clutch member, to initiate operation of the synchronizing clutch, and to effect driving interengagement between the driving and driven elements of the transmission when synchronization has been attained.

In the past it has been universally considered necessary by manufacturers of automobiles and by manufacturers of transmission gearing, to employ between the movable clutch element and the thrust element of a synchronizing mechanism, a detent or poppet connection having a break-away action for the purpose of transmitting movement from said movable clutch element to said thrust element for developing axial pressure against the blocker synchronizer rings of the mechanism. In such mechanisms, after having effected synchronization by initial movement of the shifter member in the direction of the gear position that has been selected, it is necessary to increase the force exerted against the shifter member in order to effect the break-away release of the movable clutch member from the thrust element and allow the movable clutch element to advance through the blocker teeth of the blocker synchronizer ring into clutching engagement with the clutch teeth of the gear that has been selected.

One of the objects of the present invention is to provide a transmission of the type described above, in which the resistance to shifting of the movable clutch element is uniform and relatively low until the movable clutch element encounters the blocker mechanism, so that the only point of appreciable resistance to shifting will be that point at which the shifting operation must be halted until synchronization is complete, thus eliminating any confusion between the resistance offered by the detent or poppet mechanism and that which is set up by the blocker mechanism, and automatically reducing the resistance to a very low quantity when synchronization has been completed, thus to more definitely inform the operator that synchronization has been effected.

The foregoing objects are accomplished, in general, by the provision of a synchronizing transmission of the type referred to above, in which movement is transferred from the movable clutch element to the blocker-synchronizer ring by means of thrust members arranged to receive movement from the movable clutch element solely through the medium of a purely frictional engagement between coacting faces that are parallel to the direction of shifting movement. In one of its aspects, the invention contemplates a two-stage engagement of the synchronizing friction clutch faces, the initial stage being effected by the transmission of axial thrust through the thrust member and serving merely to bias the blocker-synchronizer ring in blocking relation to the movable clutch element, and the second stage of engagement being developed by axial thrust transmitted directly from the movable clutch element to the synchronizer ring as a result of a blocking relation established in the first stage, and without being dependent upon the further transmission of thrust through the thrust member. Thus the thrust which is transmitted through the thrust member, need be only sufficient to insure the biasing of the synchronizer ring, and I find that this function is reliably performed by the purely frictional engagement between the thrust member and the movable clutch element, as hereinafter more fully described, without the use of the detent mechanism which has heretofore been considered necessary, and without the employment of spring pressure in order to produce such frictional engagement.

Another object of the invention is to provide a synchronizing transmission of the type described above, in which wearing of the parts will not affect the frictional engagement between the thrust member and the movable clutch element. To this end, the thrust members are loosely mounted between the movable clutch element and the hub on which it is mounted so as to be free to maintain their engagement with the movable clutch member as a result of centrifugal force.

Other objects, the advantages and uses of the invention will become apparent after reading the following specification and claims, and after consideration of the drawings forming a part of the specification, wherein:

Figure 1:
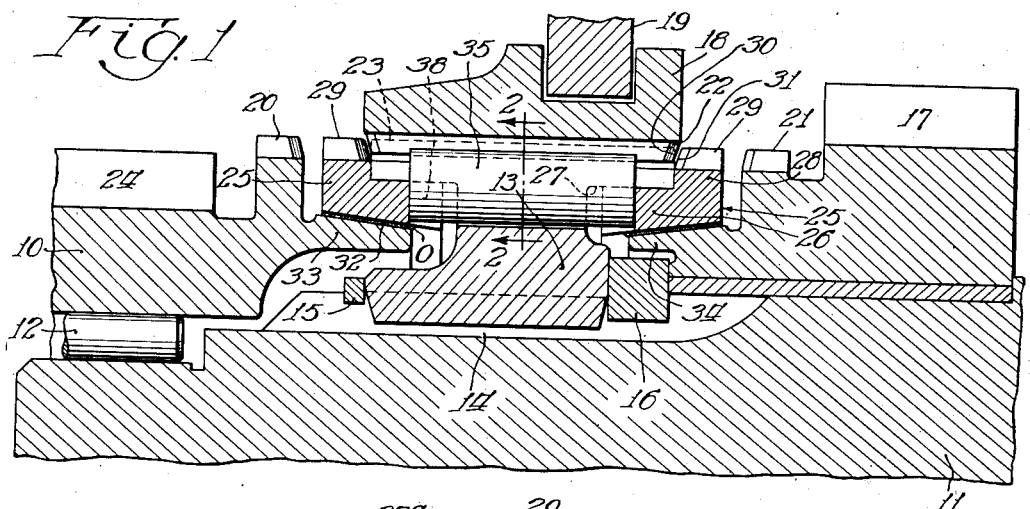
Fig. 1 is an axial sectional view through a transmission synchronizer embodying the invention.
Figure 2:
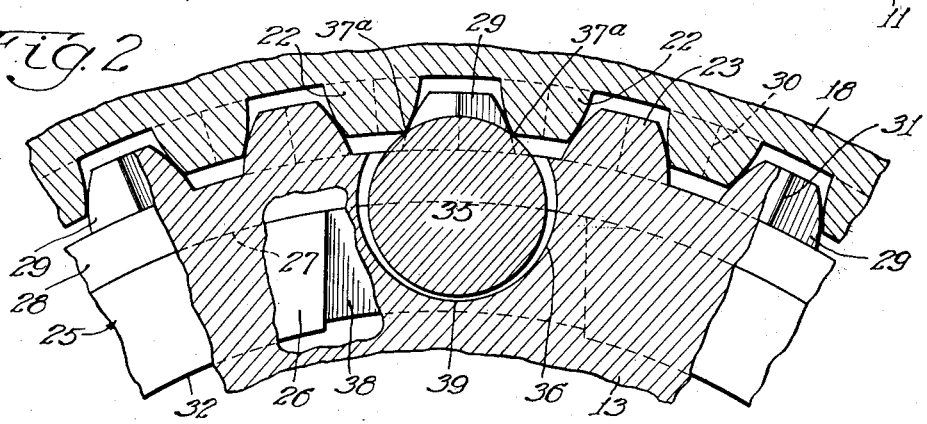
Fig. 2 is a transverse sectional view thereof taken on the line 2—2 of Fig. 1.

As illustrative of the general nature of the invention, reference may be made first to Figs. 1 and 2 of the drawing. The invention is therein shown as applied to the type of synchronizing transmission disclosed in the application of Samuel O. White, Serial No. 168,317, filed October 11, 1937. Such a transmission may include a torque-transmitting member 10, forming the rear end of the drive shaft of the transmission, and torque-transmitting members, including the driven shaft 11, piloted, as at 12, in the member 10, and the hub member 13 splined, as at 14, on the driven shaft 11 and secured against axial movement by retaining rings 15 and 16. A positive drive connection is adapted to be established between the torque-transmitting members 10 and 11, 13, or between the reduction geared torque-transmitting member 17 and the torque-transmitting members 11, 13, by an axially movable jaw clutch element 18, adapted to be shifted axially by a shifting fork 19 into positive clutching engagement with clutch teeth 20, formed on the torque-transmitting member 10, or clutch teeth 21 formed on the torque-transmitting member 17. To this end, the movable clutch element 18 is formed with internal clutch teeth 22, in sliding splined engagement with teeth 23 forming the periphery of the hub member 13, and adapted to engage the clutch teeth 20 or 21 when moved axially.

The torque-transmitting member 17 comprises part of a reduction gear train driven from a pinion 24 on the drive shaft 10, through the medium of a conventional countershaft, such as is shown in the White application above referred to. Upon being moved into clutching engagement with the clutch teeth 20, the clutch member 18 will receive rotation from the drive shaft 10 and transmit it directly through the hub 13 to the driven shaft 11. Upon being moved in the opposite direction into clutching engagement with the teeth 21, the clutch member 18 will receive rotation from the torque-transmitting member 17 through the countershaft just referred to, and will transmit it through the hub member 13 to the driven shaft 11.

In order to synchronize a torque-transmitting member 10 or 17 with the hub 13, preparatory to establishing such clutching engagement, I provide a pair of synchronizer rings 25 each including a substantially cylindrical collar portion 26 rotatably mounted in an annular groove 27 extending axially into the hub member 13, and a radially outwardly extending flange 28 formed with blocker teeth 29 between which the teeth 22 of the movable clutch element must pass before the clutching engagement may be had with the clutch teeth 20 or 21. The opposed ends of the teeth 22 and 29 may be chamfered, as shown at 30 and 31 respectively in Figs. 1 and 2. The synchronizer rings 25 are provided with internal conical clutch faces 32 adapted to engage external conical clutch faces of co-acting clutch elements 33 and 34 respectively, formed on the torque-transmitting members 10 and 17.

In order to effect initial clutching engagement between the friction clutch faces 33 or clutch faces 34, and their cooperating friction faces 32 upon the rings 25, the rings 25 are moved axially by axial thrust transmitted to them from the movable clutch element through the medium of thrust members 35. The thrust members 35 are preferably cylindrical in form, and may be simply and inexpensively made by cutting sections from a cylindrical rod of cold rolled steel. They are mounted in substantially semi-cylindrical notches 36 formed in the hub member 13, and extend out of the notches 36 into engagement with the interior surfaces of the shiftable clutch element 18, such as the corners 37a of the internal teeth 22 thereof. The notches 36 are of larger diameter than the thrust members 35 so that the thrust members 35 may be substantially out of engagement with the hub 13 when engaging the movable clutch element 18.

The ends of the thrust members 35 are engaged against the respective synchronizer rings 25, being received in elongated notches 38 so as to allow a limited amount of circumferential shifting movement of the synchronizer rings relative to the hub to occur, whereby a synchronizer ring may shift from a position in which the blocker teeth 29 are effective to block axial shifting movement of the movable clutch element 18, to a position in which it allows the movable clutch element to pass on into clutching engagement with a jaw clutch element 20 or 21. By thus utilizing the projecting ends of the thrust members for engagement in notches in the synchronizer ring, I eliminate the necessity of employing separate connecting means for establishing a lost motion connection between the blocker synchronizer ring and the hub. However, it is to be understood that the present invention is not intended to be limited to this type of lost motion connection, but may utilize one such as that shown in Fig. 3, wherein lugs 29a formed on the synchronizer ring 25a, engage in notches 27a formed in the movable clutch element 18a.

In the initial stage of the shifting operation, frictional engagement of the thrust members 35 with the interior of the movable clutch element 18 causes the thrust members to be moved axially with the movable clutch element, so that pressure will be exerted by the ends of the thrust members 35 against a synchronizer blocker ring 25. The transmission of axial thrust from the movable clutch element 18 to the thrust members 35 is purely frictional, i. e., it does not depend upon any detent connection of any kind. The term "frictional" as herein used is intended to refer to the drag that is exerted by one against the other of two surfaces both parallel to the direction of movement.

The thrust thus transmitted by the thrust members 35 will develop an initial stage of frictional clutching engagement between the synchronizer ring and one of the driving members, which may, if desired, be only sufficient to bias the synchronizer ring to one limit of its lost motion connection.

This will establish the blocking relation of the teeth 29 with respect to the teeth 22, whereby continued pressure against the shift fork 19 will cause the movable clutch element to advance into engagement with the blocker synchronizer ring and to exert axial pressure thereagainst such as to establish the second stage of frictional clutching engagement, effective for causing the synchronizer ring and the driving member with which it is thus frictionally engaged, to approach the same speed of rotation.

When synchronization is reached, there will be a momentary reversal of the direction of rotation of one torque-transmitting member with respect to the other, causing the synchronizer ring to be oscillated toward its other limit of lost motion movement relative to the hub 13, and in so doing, it will reach a position wherein the internal teeth 22 of the shiftable clutch element 18 are in register with the spaces between the blocker teeth 29, whereupon the teeth 22 which have already commenced to move into such spaces owing to the chamfered faces 30 and 31 of the respective sets of teeth, will, under the continuous urging pressure of the shifting member 19, slide between the teeth 29 and into engagement with the now synchronized clutch teeth 20 or 21. In this stage of movement, the resistance to advance of the movable clutch element has been reduced to the relatively small resistance occasioned by frictional engagement between the thrust members and the movable clutch element. There is no occasion for overcoming the resistance of a spring detent connection between these two members. As a result, the completion of the shift is very smooth and easy, and it is practically impossible for completion to be circumvented, no matter how light the pressure on the shift lever.

Figure 4:
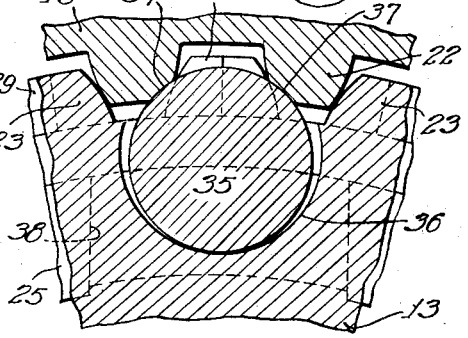
Fig. 4 is a transverse sectional view through the hub and movable jaw clutch element of another modified form of the invention.

In the form of the invention shown in Fig. 4, the corners of adjacent teeth 22 are cut away to provide surfaces 37 conforming to the contour of the thrust members 35. The spacing between these surfaces 37 and the bottom of the notch 36 is such as to loosely receive the thrust member 35. In operation, the surfaces will all be coated with the conventional gear lubricant of which the transmission gear box is filled as usually prescribed. Under the rotation of the parts around the axis of the shaft 11, occurring during operation of the transmission, centrifugal force will tend to move the thrust elements 35 away from their engagement with the surfaces of the notches 36, and into closer engagement with the surfaces 37. As a result of the engagement between the thrust members 35 and the surfaces 37 against which they are thus seated, the movable clutch element 18, in the initial stage of shifting movement, will drag with it the thrust members 35, transmitting sufficient thrust therethrough to establish the initial frictional engagement necessary for the lost motion shifting of the synchronizer rings 25.

The frictional engagement thus developed is the result of the adhesiveness of the oil film existing between the coacting surfaces of the thrust members 35 and shiftable clutch member 18, assisted by centrifugal force which develops pressure between these engaged surfaces and tends to relieve the engagement between the thrust members and the notches 36 of the hub 13. The area of engagement with the surfaces 37 is greater than the area of engagement with the hub 36. Thus the frictional engagement between the thrust members and the shiftable clutch element is sufficiently greater than that between the thrust members and the hub so that the thrust members will move with the shiftable clutch element and relative to the hub.

Even though wearing down of the engaging surfaces should increase the clearance between the thrust members and their notches, the engagement, at any given rotational speed, will still remain substantially the same.

The clearances between the friction clutch faces, when the movable clutch element is in neutral position, are preferably so arranged that a film of oil may exist between these faces and develop, under relative rotation thereof, a slight "oil drag," tending constantly to bias the synchronizer rings toward blocking positions.

At higher car speeds, centrifugal force will be a relatively more important factor in establishing the blocking relationship than at lower car speeds, whereas "oil drag," both between the friction clutch faces and between the thrust members and the movable clutch element, becomes an increasingly important factor as the car speed decreases.

In the form shown in Figs. 1 and 2, centrifugal force is a more important factor in developing the necessary engagement. In this form of the invention, the thrust members 35 simply engage the corners 37a of the teeth 22, and a space 39 is developed between each thrust member 35 and the bottom of its notch 36 when the thrust members move outwardly into engagement with the teeth 22 under the effects of centrifugal force. The space 39 is sufficient to break the engagement between the thrust members 35 and the hub 13 so that the hub will not interfere with the free movement of the thrust members 35 along with the shiftable clutch element.

Figure 3:
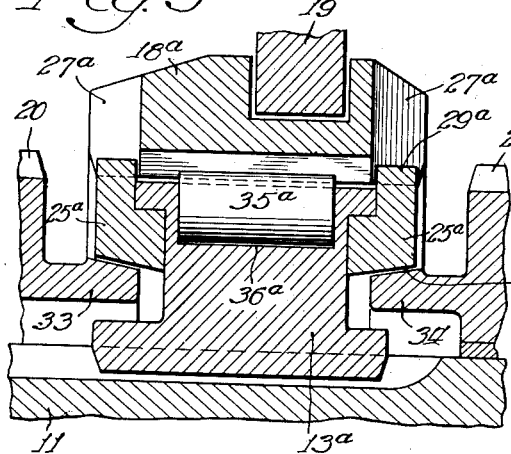
Fig. 3 is an axial sectional view of a modification of the invention.

The necessity of moving the thrust members relative to the hub is eliminated in the form of the invention shown in Fig. 3, wherein the thrust members 35a are mounted in sockets 36a in the hub, the ends of the thrust members being adapted to engage the ends of the sockets 36a so as to transmit thrust to the hub, and the latter being slidably mounted on the driven shaft 11 so that clutching movement of the synchronizer rings 25a is initiated by axial thrust transmitted to them through both the thrust members 35a and the hub 13a. The thrust members 35a are received between the movable clutch element 18a and the hub 13a with sufficient looseness to avoid causing any binding between the movable clutch element and the hub, so that the movable clutch element may be moved with perfect freedom of movement. At the same time, the thrust members are perfectly free to develop engagement with the movable clutch element under the effect of centrifugal force, which engagement will not be affected by wearing of the parts.

I claim:

1. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element connected with said one member and adapted to be moved into frictional driving engagement with said other member, and a thrust member operatively interposed between said movable clutch element and said synchronizer element, said thrust member being arranged for limited free radial movement to engage an interior surface of said annular movable clutch element with a purely frictional engagement and to transmit to said synchronizer element, when said movable clutch element is shifted axially, the thrust developed by said frictional engagement, whereby to initiate frictional driving engagement between said other torque-transmitting member and said synchronizer element.

2. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one member and adapted to be moved into frictional driving engagement with said other member, and a thrust member of substantial inertia operatively interposed between said movable clutch element and said synchronizer element, said thrust member being arranged to engage an interior surface of said annular movable clutch element with a purely frictional engagement under radial pressure developed solely by the centrifugal force in said thrust member, and to transmit to said synchronizer element, when said movable clutch element is shifted axially, the thrust developed by said frictional engagement, whereby to initiate frictional driving engagement between said other torque-transmitting member and said synchronizer element.

3. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one member and adapted to be moved into frictional driving engagement with said other member, and an axially disposed cylindrical thrust bar arranged to engage an interior surface of said movable clutch element with a radially outwardly directed, purely frictional engagement and to transmit to said synchronizer element, when said movable clutch element is shifted axially, the thrust developed by said frictional engagement, whereby to initiate frictional driving engagement between said torque-transmitting member and said synchronizer element.

4. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one torque-transmitting member and adapted to be moved into frictional driving engagement with said other torque-transmitting member and to establish a frictional drive between said members, and a thrust member loosely received between said movable clutch element and said one torque-transmitting member, said movable clutch element having an interior surface against which said thrust member is adapted to engage with a purely frictional, lubricated engagement as a result of which said movable clutch element is adapted to transmit through said thrust member to said synchronizer element, sufficient thrust to initiate clutch action between said synchronizer element and said other torque-transmitting member.

5. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one torque-transmitting member and adapted to be moved into frictional driving engagement with said other torque-transmitting member, and a thrust member loosely received between said movable clutch element and said one torque-transmitting member, said movable clutch element having an interior surface conforming substantially to the lateral contour of said thrust member against which said thrust member is adapted to engage with a purely frictional, lubricated engagement as a result of which said movable clutch element is adapted to transmit through said thrust member to said synchronizer element, sufficient thrust to initiate clutch action between said synchronizer element and said other torque-transmitting member.

6. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer ring associated with said one torque-transmitting member and having a circumferentially elongated recess, and a thrust member interposed between said movable clutch element and said ring, having an end region extending into said recess and adapted to engage a portion of the synchronizer ring to transmit axial thrust thereto and to engage circumferentially spaced regions of said recess so as to provide a lost motion driving connection between the synchronizer ring and the movable clutch element, said thrust member being adapted to have a purely frictional engagement with an interior surface of said movable clutch element, sufficient to transmit from said movable clutch element to said synchronizer ring, the requisite axial thrust for initiating frictional driving engagement between said other torque-transmitting member and the synchronizer ring.

7. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one member and adapted to be moved into frictional driving engagement with said other member, and a thrust member operatively interposed between said movable clutch element and said synchronizer element, said thrust member being radially interposed between said movable clutch element and said one torque-transmitting member, having a relatively large area of purely frictional, axially slidable engagement with said movable clutch member and a relatively small area of axially slidable engagement with said one torque-transmitting member, whereby it will be moved along with said movable clutch element so as to transmit axial thrust from said movable clutch element to said synchronizer element.

8. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one torque-transmitting member and adapted to be moved into frictional driving engagement with said other torque-transmitting member to establish a frictional drive between said members, and a thrust member loosely received between said movable clutch element and said one torque-transmitting member, its end adapted to engage the synchronizer element and its side adapted to interiorly engage said movable clutch element with a purely frictional engagement, whereby said thrust member may receive from said movable clutch element and transmit to said synchronizer element, through the medium of said one torque-transmitting member, axial thrust in sufficient amount to initiate frictional clutching engagement between said synchronizer element and said other torque-transmitting member.

9. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one member and adapted to be moved into frictional driving engagement with said other member and to establish a frictional drive between said members, and a thrust member loosely received between said movable clutch element and said one torque-transmitting member, axially movable relative to both, and adapted to have a purely frictional engagement with an interior surface of said movable clutch element, whereby the latter, when shifted, is adapted to exert a drag against the thrust member, developed partly by centrifugal force in said thrust member, and to transmit to said synchronizer element from said movable clutch element, through said thrust member, thrust for initiating frictional driving engagement between said synchronizer element and said other torque-transmitting member.

10. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one member and adapted to be moved into frictional driving engagement with said other member, and a thrust member adapted to have a purely frictional, lubricated engagement with an interior surface of said movable clutch element, developed solely by the combined forces of adhesiveness of the lubricant and centrifugal action of said thrust member, sufficient to transmit to said synchronizer element from said movable clutch element, thrust for initiating frictional driving engagement between said synchronizer element and said other torque-transmitting member.

11. In a synchronizing transmission, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element adapted to be moved into frictional driving engagement with said other member, having a lost motion driving connection with said one torque-transmitting member and including blocking means adapted, in one of its positions permitted by said lost motion connection, to block the path of axial shifting movement of said movable clutch element and, in another of such positions, to allow the movable clutch element to complete its axial shifting movement, and a thrust member loosely interposed between said movable clutch element and said one member for limited free radial movement and having a purely frictional engagement with said movable clutch element, adapted, during an initial stage of shifting movement thereof, to initiate said frictional driving engagement for biasing said synchronizer element in blocking relation to said movable clutch element, whereby engagement of the latter against said blocking means may serve to transmit axial thrust to the synchronizer element so as to amplify said frictional clutching engagement for completing synchronization.

12. In a synchronizing transmission, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element adapted to be moved into frictional driving engagement with said other member, and a thrust member forming a lost motion connection between said one torque-transmitting member and said synchronizer element, the latter including blocking means adapted, in one of its positions permitted by said lost motion connection, to block the path of axial movement of said movable clutch element and, in another of such positions, to allow the movable clutch element to complete its axial shifting movement, said thrust member having a purely frictional engagement with said movable clutch element and being adapted, during an initial stage of shifting movement thereof, to initiate said frictional driving engagement for biasing said synchronizer element in blocking relation to said movable clutch element, whereby engagement of the latter against said blocking means may serve to transmit axial thrust to the synchronizer element so as to amplify said frictional clutching engagement for completing synchronization.

13. In a synchronizing transmission, a pair of axially aligned torque-transmitting members, a movable jaw clutch sleeve surrounding and carried by one of said members and movable into positive clutching engagement with a jaw clutch element drivingly associated with the other member, thus to establish a positive drive connection between said members, said one member having in its periphery an axially extending notch, a synchronizer element drivingly associated with said one member and movable axially into frictional driving engagement with a friction clutch element drivingly associated with said other member so as to establish a frictional drive between said members, and a thrust bar loosely received in said notch between said movable clutch element and said one torque-transmitting member, said movable clutch element having an interior surface against which said thrust bar is adapted to engage with a purely frictional engagement as a result of which said movable clutch element is adapted to transmit through said thrust member to said synchronizer element, axial thrust for initiating frictional driving engagement between said synchronizer element and said friction clutch element.

14. In a synchronizing transmission, a pair of axially aligned torque-transmitting members, a movable jaw clutch sleeve encircling and having axially extending teeth meshing with splines in one of said members, and shiftable axially into engagement with a jaw clutch element drivingly associated with the other member, thus to establish a positive drive connection between said members, a synchronizer ring drivingly associated with said one member and axially movable for establishing frictional driving engagement with a friction clutch element drivingly associated with the other member, said one member having in its periphery a semi-cylindrical axially extending notch, and a cylindrical thrust bar loosely received in said notch and engaging some of the teeth of said jaw clutch sleeve with a purely frictional engagement, said thrust bar being arranged to positively transmit thrust to said synchronizer ring whereby axial shifting movement of said movable jaw clutch sleeve will transmit through said bar, axial thrust for initiating said frictional drive engagement.

15. A synchronizing transmission as defined in claim 14, wherein said semi-cylindrical notch is slightly larger in diameter than said thrust bar, so as to minimize oil drag between said thrust bar and said one torque-transmitting member.

16. A synchronizing transmission as defined in claim 14, wherein said thrust bar is received at its end in a notch in said synchronizer ring so as to establish the driving connection between the synchronizer ring and said one member.

17. In a synchronizing transmission, a pair of torque-transmitting members mounted in axial alignment, a jaw clutch sleeve surrounding and carried by one of said members and movable axially into engagement with a jaw clutch element drivingly associated with the other member, thus to establish a positive drive connection between said members, a synchronizer element associated with said one member and adapted to be moved into frictional driving engagement with said other member so as to establish a frictional drive between said members, and a thrust member of substantial inertia arranged for limited free radial movement to engage an interior surface of said annular movable clutch element with a thrust receiving engagement under radial pressure developed solely by the centrifugal force in said thrust member, and to transmit to said synchronizer element, when said movable clutch element is shifted axially, the thrust developed by said thrust receiving engagement, whereby to initiate the frictional driving engagement between said other torque transmitting member and said synchronizer element.

18. In a synchronizing transmission, a shaft, a hub axially movable thereon, a movable jaw clutch sleeve surrounding and drivingly connected to said hub and shiftable axially into engagement with a member to be synchronized therewith, a synchronizer element drivingly associated with said hub and shiftable axially into frictional driving engagement with said member to be synchronized, and a thrust member loosely recessed into the peripheral region of said hub for limited free radial movement to engage an interior surface of said sleeve with a purely frictional engagement and having axial extremities in positive thrust transmitting engagement with said hub at the extremities of the recess, for transmitting to said synchronizer element, when said sleeve is shifted axially, the thrust developed by said frictional engagement, whereby to initiate a frictional drive between said synchronizer element and said other torque-transmitting member.

19. A synchronizing transmission as defined in claim 14, wherein said thrust bar is arranged in registry with a space between a pair of said jaw clutch sleeve teeth and adapted to engage the corners of said teeth.

SAMUEL O. WHITE.

CERTIFICATE OF CORRECTION.

Patent No. 2,221,895.  November. 19, 1940.

SAMUEL O. WHITE.

It is hereby certified that error appears in the printed specification of the above numbered patent requiring correction as follows: Page 3, second column, line 69, claim 1, for the word "connected" read --associated--; and that the said Letters' Patent should be read with this correction therein that the same may conform to the record of the case in the Patent Office.

Signed and sealed this 25th day of February, A. D. 1941.

(Seal)

Henry Van Arsdale,
Acting Commissioner of Patents.